Aug. 14, 1956 — T. J. SULLIVAN — 2,759,134
CAPACITOR
Filed April 14, 1953
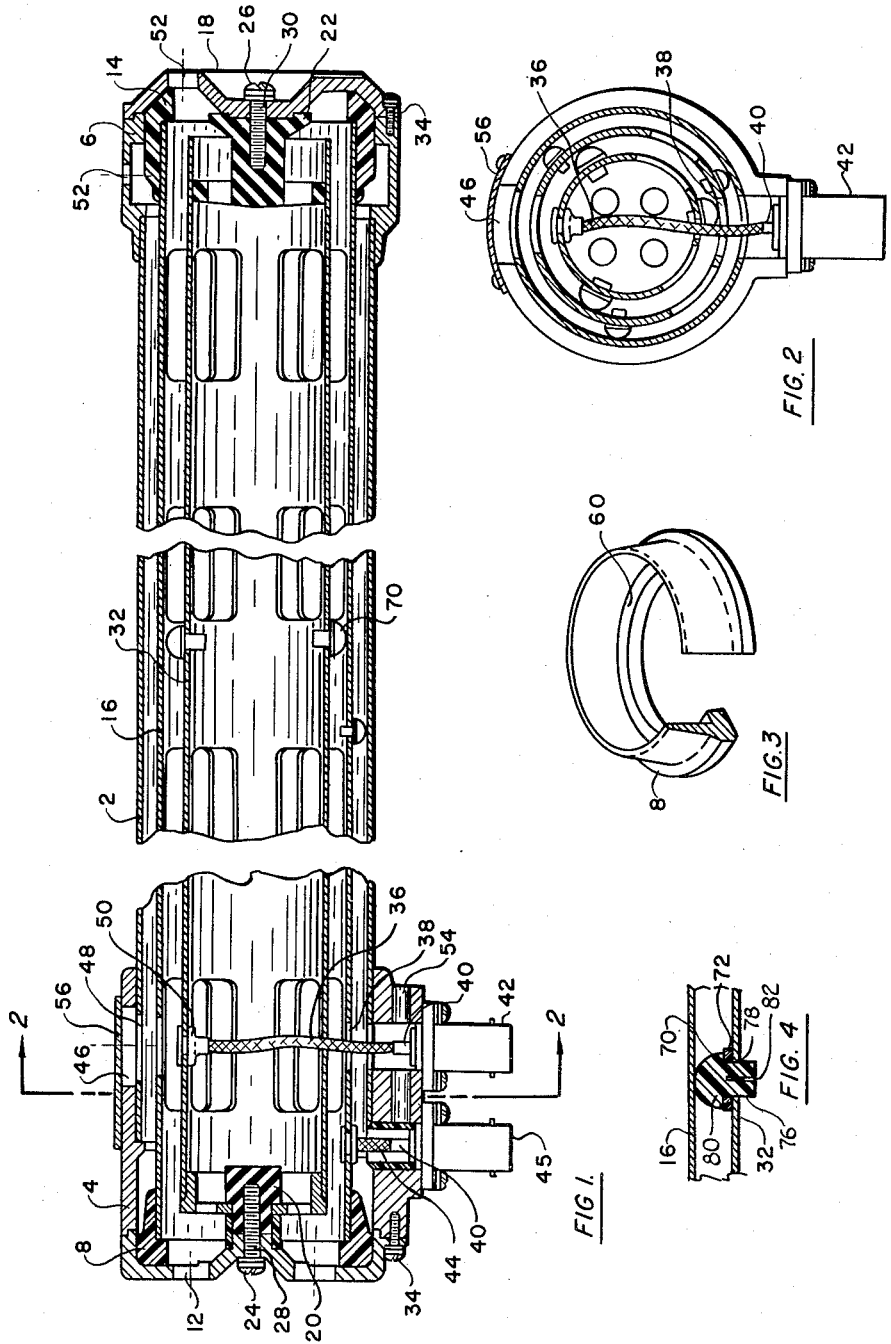
INVENTOR
Thomas J. Sullivan
BY Leonard H. King
AGENT

United States Patent Office

2,759,134
Patented Aug. 14, 1956

2,759,134

CAPACITOR

Thomas J. Sullivan, Glendale, N. Y., assignor to Avien, Inc., Woodside, N. Y.

Application April 14, 1953, Serial No. 348,737

2 Claims. (Cl. 317—246)

This invention relates to capacitors, and particularly to capacitors for use in capacitor-type liquid level sensing apparatus.

In the capacitor-type liquid level sensing apparatus a liquid, having a dielectric constant differing from that of air, is made the dielectric of a capacitor. The displacement of the liquid by air results in a change of capacitance thus providing a measure of liquid level. In general, such a system utilizes a capacitor formed of parallel or concentric plates extending from top to bottom of the fuel tank with the plates of the capacitor connected into a modified Wheatstone bridge as one arm of the bridge. Whereas a variety of self-balance methods may be employed, the balancing arm is often a servomechanism operated variable potentiometer which is coupled to an indicating means. A number of such systems are currently in use in the industry and are well known to those familiar with the art.

In general, the capacitance sensing units consist of two concentric cylinders spaced apart which are enclosed in a housing which is normally a third concentric tube fitted with supporting end plates. These units normally extend from the top to the bottom of the tank. In aircraft installations wherein the tank is used for fuels, water present in the fuel, and water resulting from condensation of moisture, collects at the bottom of the tank. This water may contain other contaminating agents, thus in place of a non-conductive liquid between the plates, a conductive liquid may be present. Also, it has been found that water tends to form droplets which, even if the tank be emptied, tends to stick to various surfaces due to the adhesive force present.

The insulators used to space the two concentric tubes, which form the electrodes, are particularly vulnerable to the action of the water resulting in electrical leakage paths across the dielectric which effect the accuracy of the operation and may even completely short out the capacitor.

It is an object of this invention to provide an improved capacitive type liquid level sensing apparatus.

It is another object of this invention to provide an improved insulator for capacitive type liquid level sensing apparatus.

It is still a different object of this invention to provide an easily assembled sensing capacitor.

It is still a different object of this invention to provide a mechanically improved liquid level sensing apparatus.

It is still a further object of this invention to provide a liquid level sensing capacitor having high resistance to failure under vibration.

Other objects of the invention and the advantages thereof will become apparent during the course of the following description of the capacitance type liquid level sensing device taken in conjunction with the accompanying drawings.

In the accompanying drawings:

Figure 1 is a partially sectioned view of a sensing unit embodying various features of this invention.

Figure 2 is a top sectional view of the sensing unit.

Figure 3 is an isometric view, partially sectioned of a resilient electrically non-conducting supporting member of this invention.

Figure 4 shows a typical spacing insulator of this invention.

In the figures, like numbers refer to like items.

More specifically as is shown in Figure 4, insulator member 70 comprises a shaft portion 76 which is inserted through opening 78 of electrode 32. A shoulder portion 80 is provided which prevents member 70 from slipping through opening 78, and compresses the deformable rubber member 72. The resiliency of member 72 permits a tight fit to be maintained between outer electrode 16 and member 70 as may be appreciated from the drawing. Assembling of the device is quite simple since the installation of a particular spacing member 70 requires only the insertion of shaft portion 76 into hole 78. It is desirable to provide a slot 82 in the spacer member to make easy the insertion of shaft portion 76.

In the sensing unit of Figure 1, a cylindrical member 2 supports top flange 4 and bottom flange 6 to form a housing which serves as a supporting member for the sensing capacitor as well as an electrical shield.

Housing 2 is formed of aluminum tubing having a flange 4 of cast aluminum or magnesium at one end while flange 6 at the other end is a machined aluminum fitting. A tetrafluoroethylene annular member 8 is tightly secured by cover plate 12 and outer electrode 16, and tetrafluoroethylene annular member 14 is secured by flange 6, cover plate 18 and outer electrode 16.

The annular member 8 and annular member 14 are so positioned with respect to each other that they fixedly position a cylindrical electrode 16 which forms one electrode of the sensing capacitor. Attached to flanges 4 and 6 are plates 12 and 18 to which electrically non-conductive mounting members 20 and 22 are mounted by means of bolts 24 and 26 passed through holes 28 and 30, members 20 and 22 being centered with respect to cylinder 16. The mounting members may be formed of a laminated nylon fabric impregnated with a phenolic resin. A second electrode of the sensing capacitor is provided by cylinder 32 which is positioned by insulators 20 and 22 with respect to the outer electrode 16.

Inner electrode 32 and outer electrode 16 are perforated. Inner electrode 32 is rotatable about its axis so that the relative position of the perforations in inner electrode 32 and the outer electrode 16 may be varied, thus varying the capacitance of the sensing capacitor. When adjusted to provide proper inter-electrode capacitance, plate 12 is tightened down to flange 4 by means of bolts 34 so as to tightly clamp inner electrode 32 between mounting means 20 and 22, and thus prevent it from rotating. Conductor 36 is connected between inner electrode 32 through opening 38 in electrode 16 and the inner contact 40 of connector 42. Electrode 16 is connected by means of a conductor 44 to inner contact 49 of connector 45. It is preferred that conductor 36 be of braided wire to permit adjustment of electrode 32 by rotation about its axis and avoid the vibratory effects resulting from use of stiff wire.

Access hole 46 in the flange and hole 48 in electrode 16 is provided for ease of assembly as the assembler may insert the lead 36 through openings in electrode 16 and 32 and through a hollow brass rivet 50 which provides a terminal receptive to soft lead solder. Soldering is accomplished by means of a soldering iron inserted through said access hole.

Drainage holes 52 are provided to permit the fuel to rise and fall between the electrodes. A number of other openings, not shown permit the level to be constant between the electrodes and the outer electrode 16 and housing 2. Passage 54 is specifically provided to permit the free flow of liquid from the terminals so as to preclude the trapping of water droplets at the terminals. Access hole 46 may be covered by nameplate 56.

The successful operation of the particular apparatus shown in Figure 1 is, in part, dependent on the properties of the insulators chosen.

While polytrifluoromonochloroethylene and tetrafluoroethylene are closely related fluorocarbons, it has been found that they are not interchangeable in this application.

Annular member 8, shown in detail in Figure 3, is preferably made of tetrafluoroethylene because it is a resilient material which will resiliently secure the outer electrode 16 and serve as a wedge between housing 4 and outer electrode 16, a shelf 60 being provided to position the electrode. Annular member 14 is generally similar. Polytrifluoromonochloroethylene has been found unsuitable for this application because it is a rigid substantially undeformable material and, therefore, it does not have sufficient flow to wedge the electrode in fixed relationship to the outer housing.

Tetrafluoroethylene, in turn, has been found unsatisfactory as spacer 60 because of its flow properties which results in its deforming and loosening in use. A preferred assembly, shown in Figure 4, has been found in the use of a polytrifluoromonochloroethylene member 70 kept in compression against the outer electrode 16 by means of a resilient rubber gasket 72, formed of Buna "N," which is maintained under compression during assembly.

While I have disclosed what I believed to be the best embodiment of this invention known, it is to be understood that modifications and changes may be made in the disclosed invention without departing from the spirit or the scope of the invention as covered by the appended claims.

I claim:

1. A liquid level sensing capacitor comprising in combination: a first electrode provided with holes for receiving shafted insulators, a second cylindrical electrode concentric about said first electrode, insulator means maintaining the ends of said first and said second electrode in spaced relationship, a plurality of insulator members having a flange portion and a shaft portion, said shaft portions being arranged to extend through said holes in said first electrode at points intermediate to the ends of said first electrode so as to maintain a spaced relationship between said first and said second electrode at points intermediate their ends, and resilient members positioned on said shafts between said flange portion and said first electrode.

2. The apparatus of claim 1 wherein said shaft is slotted.

References Cited in the file of this patent

UNITED STATES PATENTS

| | | |
|---|---|---|
| 1,915,249 | Jorgensen | June 20, 1933 |
| 2,426,252 | Thomson | Aug. 26, 1947 |
| 2,560,757 | Bowar | July 17, 1951 |
| 2,563,281 | Griffith | Aug. 7, 1951 |
| 2,619,443 | Robinson | Nov. 25, 1953 |
| 2,642,625 | Peck | June 23, 1953 |
| 2,677,809 | Bradburd | May 4, 1954 |

FOREIGN PATENTS

| | | |
|---|---|---|
| 368,401 | Germany | Feb. 2, 1923 |